United States Patent [19]

Boyer

[11] 4,413,776
[45] Nov. 8, 1983

[54] RESET CONTROLLER WITH IMPROVED AIR FLOW SPAN ADJUSTMENT

[75] Inventor: George C. Boyer, Rockford, Ill.

[73] Assignee: Barber-Colman Company, Rockford, Ill.

[21] Appl. No.: 330,705

[22] Filed: Dec. 14, 1981

[51] Int. Cl.³ .............................................. F24F 13/10
[52] U.S. Cl. ....................................... 236/49; 137/486; 74/522
[58] Field of Search ........................... 236/49, DIG. 1; 137/486; 74/522

[56] References Cited

U.S. PATENT DOCUMENTS

| | | | |
|---|---|---|---|
| 2,190,506 | 2/1940 | Wurr | 236/DIG. 1 |
| 2,194,533 | 3/1940 | Van Dyke | 236/DIG. 1 |
| 2,256,121 | 9/1941 | McCarty | 62/106 |
| 2,793,540 | 5/1957 | Cronk | 74/522 |
| 3,809,314 | 5/1974 | Engelke et al. | 236/82 X |
| 4,074,588 | 2/1978 | Cumming | 236/DIG. 1 |
| 4,104,939 | 8/1978 | Bonaddio | 74/522 X |
| 4,264,035 | 4/1981 | Maxson et al. | 236/87 |

Primary Examiner—William E. Tapolcai
Attorney, Agent, or Firm—Leydig, Voit, Osann, Mayer & Holt, Ltd.

[57] ABSTRACT

A controller for a damper maintains a substantially constant volumetric rate of flow of air through a duct into a controlled space for a given condition in the space and resets the rate of flow as a function of at least one sensed condition which causes changes in a control pressure. A dual lever system enables the controller to be calibrated to establish various air flow spans while utilizing substantially the full available range of control pressure to effect a change in air flow within each selected span.

1 Claim, 5 Drawing Figures

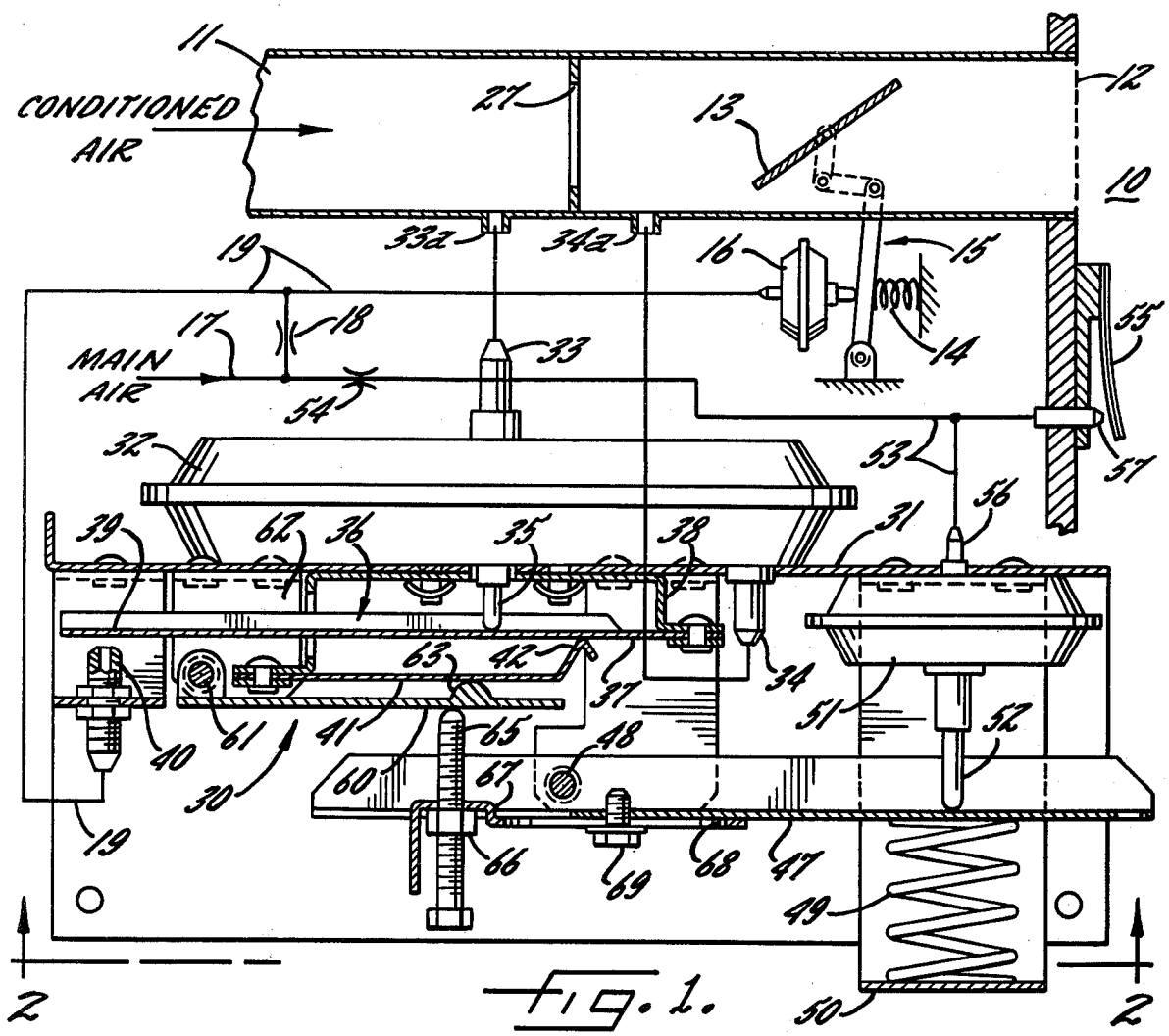
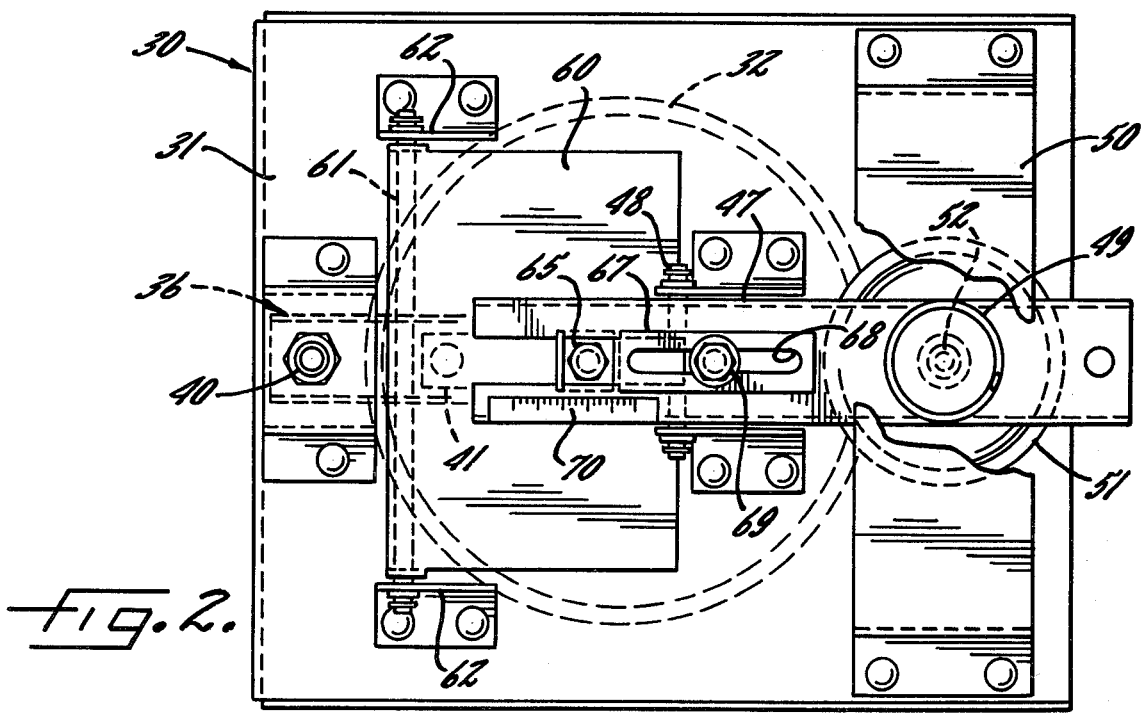

RESET CONTROLLER WITH IMPROVED AIR FLOW SPAN ADJUSTMENT

BACKGROUND OF THE INVENTION

This invention relates to a controller for regulating the volumetric rate of flow of air through a duct. More particularly, the invention relates to a controller for maintaining a substantially constant volumetric rate of flow of air at a predetermined sensed condition and for resetting the constant volumetric flow rate as a function of at least one sensed condition.

A controller of this general type is disclosed in Maxson et al U.S. Pat. No. 4,264,035. In that controller, a pneumatic actuator resets the flow rate in response to changes in a control pressure signal which varies over a predetermined range of pressures. When the controller is calibrated to cause the air flow rate to vary across a maximum span, substantially the full range of the variable control pressure is available to effect the change. If the controller is adjusted, however, to reduce the air flow span, only a portion of the control pressure range may be utilized. As a result, the system is very sensitive at lower air flow spans and thus the air flow tends to change abruptly from one extreme to the other rather than modulating gradually between the two extremes.

SUMMARY OF THE INVENTION

The general aim of the present invention is to provide a unique controller which overcomes the aforementioned problems and which allows the air flow rate to be changed over a wide range of spans while effecting good modulation within each span.

A related object of the invention is to provide a controller which may be calibrated to establish various air flow spans and which utilizes virtually the full available range of control pressure to effect a change in the air flow within each selected span.

A more detailed object is to achieve the foregoing by providing a controller having a novel lever system and having uniquely arranged calibration means which enable adjustment of the air flow span to be effected independently of adjustment of the minimum air flow setting.

The invention also resides in the simple and easy manner by which the principles of the invention may be incorporated in either a single reset controller or a dual reset controller.

These and other objects and advantages of the invention will become more apparent from the following detailed description when taken in conjunction with the accompanying drawings.

BRIEF DESCRIPTION OF THE DRAWINGS

FIG. 1 is an elevational view, partly in section, and schematically showing one embodiment of a new and improved controller incorporating the unique features of the present invention.

FIG. 2 is a bottom plan view, on a reduced scale as taken substantially along the line 2—2 of FIG. 1.

DETAILED DESCRIPTION OF THE PREFERRED EMBODIMENTS

Figure 3:
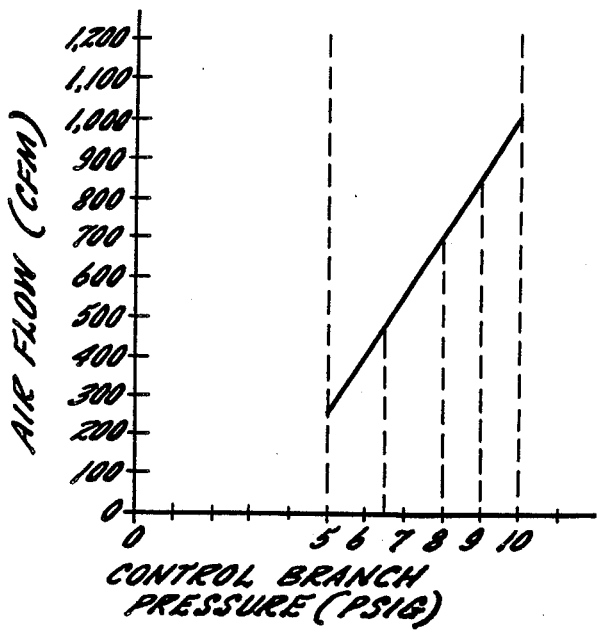
FIG. 3 is a graph which shows air flow as a function of control pressure for a controller of the type disclosed in the aforementioned Maxson et al patent.

FIG. 1 shows one application of a pneumatic controller of the invention and, in this particular instance, the controller is of the single reset type. It may be assumed that the space 10 to be regulated by the controller is in an interior zone which normally requires the introduction of cold air in order to maintain a comfortable temperature.

To meet this requirement, cold conditioned air is delivered through a duct 11 and a grille 12 into the controlled space 10. A damper 13 controls the volumetric rate of flow of conditioned air through the duct. The damper is biased to a normally open position by a spring 14 acting through a linkage 15. Variable damper branch air pressure is supplied to a pneumatic damper actuator 16 which is positioned to oppose the bias force exerted by the spring on the linkage and which thus determines the position of the damper. Branch air is obtained from a source of compressed air, usually at 15 psig., supplied through a main 17. After passing through a restrictor 18, the main air becomes damper branch air in a damper branch 19 communicating with the actuator 16. The manner of varying the pressure of the damper branch air will be disclosed later.

The reset controller 30 comprises a base 31 upon which is mounted a differential pressure-to-mechanical force transducer 32. A high pressure port 33 on the transducer communicates with a high pressure tap 33a located upstream from an orifice 27 in the duct 11 while a low pressure port 34 communicates with a low pressure tap 34a located downstream from the orifice. The transducer thus produces a differential force at a pin 35 proportional to the difference between the pressures of air in the duct upstream and downstream from the orifice and thereby furnishes a measure of the volumetric rate of flow of conditioned air through the duct. The pin 35 bears against a rigid flapper 36 which is joined to a short flexible portion 37 cantilevered on a bracket 38 in fixed spaced relation to the base 31. The free end portion 39 of the flapper is movable toward and away from a bleed nozzle 40 which communicates with the damper branch 19 to control the branch air pressure therein. The flapper is urged away from the nozzle by a bias member such as a leaf spring 41 cantilevered on the bracket 38 and having a free end portion 42 engaging the flapper to apply a bias force in opposition to the variable force applied by the pin 35.

The variable position of the flapper 36 with respect to the nozzle 40 thus is established by a balance of the forces applied by the pin 35 and the spring 41. As the rate of flow of conditioned air through the duct 11 increases, the differential pressure between the taps 33a and 34a increases, producing a greater force by the pin 35 against the flapper to move the flapper closer to the nozzle. This causes less air to bleed through the nozzle so as to increase the damper branch air pressure and increase the force applied by the damper actuator 16. Accordingly, the actuator moves the damper 13 further toward its closed position, thereby reducing the rate of flow of conditioned air through the duct 11 in a manner tending to maintain a constant volumetric rate of air flow therethrough regardless of the pressures upstream and downstream of the orifice 27.

A constant volumetric rate of flow of cold conditioned air into a condition controlled space is desirable under uniform temperature conditions but is not satisfactory under changing temperature conditions. When the temperature in the controlled space increases, more cold air is required and, as the temperature falls, less cold air is needed. The rate of flow of cold conditioned air into the controlled space must therefore be controlled as a function of the sensed temperature in the space. To this end, the steady biasing force which the leaf spring 41 applies to the flapper 36 is only sufficiently high to assure a desired minimum rate of conditioned air flow through the duct. This minimum rate must be sufficient to meet ventilation requirements. In order to increase the rate of flow when more cooling is required, a variable biasing force also is applied to the spring and the flapper.

For this purpose, a lever 47 is pivoted on a pin 48 in fixed relation to the base 31. A bias spring 49 acts between one end portion of the lever and a fixed bracket 50 on the base and exerts a bias force tending to move the other end portion of the lever away from the leaf spring 41. A pneumatic control actuator 51 with a reciprocating pin 52 is mounted on the base 31 in a position to oppose the force of the bias spring 49 on the lever 47. The actuator is operated as a function of variable pressure in a control branch 53. Air in the control branch is obtained from the main 17 through a restrictor 54. The pressure in the control branch is determined by a pneumatic thermostat 55 which is direct acting in this particular instance.

The control branch 53 communicates with the actuator 51 by way of a port 56 in the actuator and also communicates with a bleed port 57 of the thermostat 55. Accordingly, the pin 52 of the actuator 51 exerts a force on the lever 47 in direct proportion to the control branch pressure, such pressure being a direct function of the temperature sensed by the thermostat. The angular position of the lever 47 thus is determined by the sensed temperature. At high sensed temperatures, the control branch air pressure is high so that the control actuator 51 swings the lever 47 clockwise against the bias of the spring 49 so as to move the free end portion of the lever toward the leaf spring 41. Such movement increases the biasing force applied by the spring 41 to the flapper 36 so as to move the flapper further away from the nozzle 40, thereby reducing the pressure in the damper branch 19 and causing the damper 13 to open and deliver a greater volume of cold air through the duct 11. As the sensed temperature decreases, the pressure in the control branch 53 decreases to permit the spring 49 to swing the lever 47 counterclockwise so that the free end portion of the lever moves away from the leaf spring 41. As a result, the bias on the leaf spring is reduced so as to enable the flapper 36 to move toward the nozzle 40 and to increase the pressure in the damper branch 19. Thus, the damper closes to reduce the flow of cold air through the duct.

The controller 30 as described thus far operates in a manner similar to the controller disclosed in Maxson et al U.S. Pat. No. 4,264,035. Typically, the pressure in the control branch (e.g., the control branch 53) of such a controller varies from 5 psig. to 10 psig. over the full range of movement of the thermostat. In different installations, it may be required to establish a different span of volumetric air flow rates between the minimum and maximum rates. For example, one installation may require a minimum flow rate through the duct 11 of 250 cfm. and a maximum flow rate of 500 cfm. while a different installation may require a minimum flow rate of 250 cfm. and a maximum flow rate of 1,000 cfm. Thus, the controller must be calibrated or adjusted to establish different air flow spans. When a controller of the type disclosed in the Maxson et al patent is adjusted to reduce the span, the range of usable pressures in the control branch also is reduced. FIG. 3 is a graph which approximately illustrates the manner in which air flow varies with respect to control branch pressure in a controller of the type disclosed in the Maxson et al patent. When the span is large (e.g., 250 to 1,000 cfm.), the full range (i.e., 5 to 10 psig.) of control branch pressure is available to effect the change in air flow. When the span is reduced, however, to a value of, for example, 250 to 500 cfm., the available range of control branch pressure also is reduced (e.g., the range may be reduced to between 5 and 6.5 psig.). Because the damper is moved between its extreme positions by a limited range of control pressure, the system tends to be very sensitive with the damper tending to swing abruptly to its extreme positions rather than moving between those positions with a gradual, modulating movement.

In accordance with the present invention, the controller 30 is uniquely constructed to permit the controller to be easily adjusted to establish different air flow spans and, at the same time, to operate over and utilize the full available range of control branch pressure for each selected air flow span. Because the full range of control pressure is utilized for each air flow span, the system operates in a more stable manner with the damper 13 moving smoothly between its extreme positions and gradually modulating the air flow during such movement.

In carrying out the invention, provision is made of a second lever 60 which coacts with the lever 47 to adjust the variable biasing force applied to the leaf spring 41 and the flapper 36. As shown in FIGS. 1 and 2, the second lever 60 is supported to swing about a pin 61 which extends parallel to the pivot pin 48 of the lever 47 and which is mounted by brackets 62 fixed to the base 31. One portion of the lever 60 underlies the leaf spring 41 and its upper side carries a rounded hump 63 which bears against the underside of the leaf spring. For purposes of simplicity, the hump has been shown as being integral with the lever 60 but it should be understood that the hump or similar means may be placed on the lever in various ways. The purpose of the hump is to transmit force from the lever 60 to the spring 41 while keeping the free end of the lever out of engagement with the spring.

The lever 60 is swung in one direction in response to the lever 47 swinging in the opposite direction. For this purpose, an adjustable element 65 is carried by one of the levers (herein, the lever 47) and bears against the other lever (i.e., the lever 60). In this instance, the adjustable element 65 is in the form of a set screw which may be adjusted vertically relative to the lever 47, there being a lock nut 66 for holding the screw in its vertically adjusted position.

Further in keeping with the invention, the set screw 65 is adapted to be adjusted lengthwise of the levers 47 and 60 in order to locate the screw selected different distances from the pivot pins 48 and 61. As shown in FIG. 2, the screw extends through and is carried by a slide 67 which is located adjacent the free end portion of the lever 47 and which forms an extension of that lever. An elongated slot 68 is formed through the side and receives a screw 69 which is threaded into the lever 47. By loosening the screw 69, the slide may be moved lengthwise of the lever 47 to increase or decrease the distance between the screw 65 and the pivot pin 48 and, of course, to inversely change the distance between the screw and the pivot pin 61. A calibrated scale 70 (FIG. 2) is located on the lever 47 adjacent the slide to enable the screw 65 to be adjusted to a selected position.

With the foregoing arrangement, the screw 65 may be adjusted vertically on the slide 67 to engage the lever 60 and establish the steady force which is necessary to insure minimum air flow rate. In other words, the screw 65 acts against the lever 60 which in turn acts through the hump 63 to deflect the leaf spring 41 upwardly into engagement with the flapper 36 with such force as to space the flapper from the nozzle 40 by the distance required to set the minimum air flow rate. By adjusting the screw 65 upwardly relative to the slide 67, the steady biasing force may be increased to increase the minimum flow rate. Conversely, the steady biasing force is decreased and reduces the minimum flow rate when the screw 65 is adjusted downwardly relative to the slide.

Pursuant to the invention, the air flow span is adjusted by changing the position of the slide 67 relative to the lever 47 so as to effectively lengthen or shorten that lever. Assume, for example, that a span of between 250 and 1,000 cfm. is desired. To establish such a span, the screw 65 is adjusted vertically relative to the slide 67 to set the minimum flow rate of 250 cfm. The slide 67 then is adjusted lengthwise to a predetermined position on the lever 47 to space the screw 65 predetermined distances from the pivots 48 and 61 of the levers 47 and 60. The lengthwise position of the slide is chosen such that, when the lever 47 is pivoted through a certain angular distance by pressures in the control branch 53 ranging from 5 to 10 psig. (for example), the lever 60 and the flapper 36 are swung through a distance to increase the flow rate from 250 to 1,000 cfm. Thus, the full range of control branch pressure is utilized to adjust the air flow over the selected span.

Now assume that a reduced air flow span of 250 to 500 cfm. is desired. To achieve such a span, the vertical position of the set screw 65 relative to the slie 67 is left the same as before so as to keep the minimum flow rate at 250 cfm. The slide, however, is adjusted a predetermined distance to the right to decrease the effective length of the lever 47 and to shorten the distance between the set screw 65 and the pivot 48 while increasing the distance between the set screw and the pivot 61. By virtue of this adjustment, swinging of the lever 47 through a given angular distance results in the lever 60 swinging through a shorter angular distance than was the case in the previously described position of the screw. Accordingly, when the full range of pressure in the control branch 53 swings the lever through the same angular distance as in the previous case, the lever 60 and the flapper 36 are swung through a distance which is effective only to increase the flow rate from 250 to 500 cfm. It will be noted that, while the point at which force is applied to the lever 60 by the screw 65 may be adjusted, the point at which force is applied to the leaf spring 41 by the hump 63 remains substantially constant for all adjusted positions of the screw. Thus, when a given force is applied to the leaf spring 41, the deflection of the spring is constant and does not change as otherwise would be the case if the point of force application were adjusted along the length of the spring.

Figure 4:
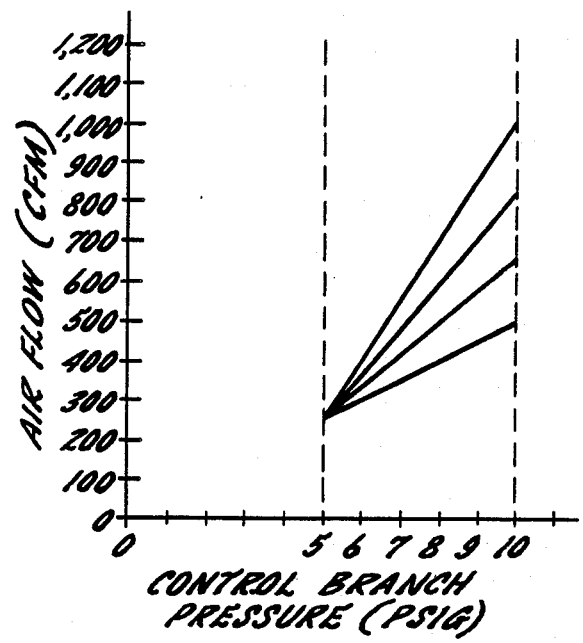
FIG. 4 is a graph similar to FIG. 3 but pertains to the controller of the present invention.

FIG. 4 is a graph similar to FIG. 3 but illustrates approximately the manner in which air flow varies with respect to control branch pressure in the new controller 30 of the present invention. From FIG. 4, it will be apparent that the full range of control branch pressure is available for all spans of air flow. Thus, the sensitivity of the system tends to remain constant rather than increasing when the span is reduced. This enables better control of the damper 13 and of other system elements which are operated in sequence with the damper.

Figure 5:
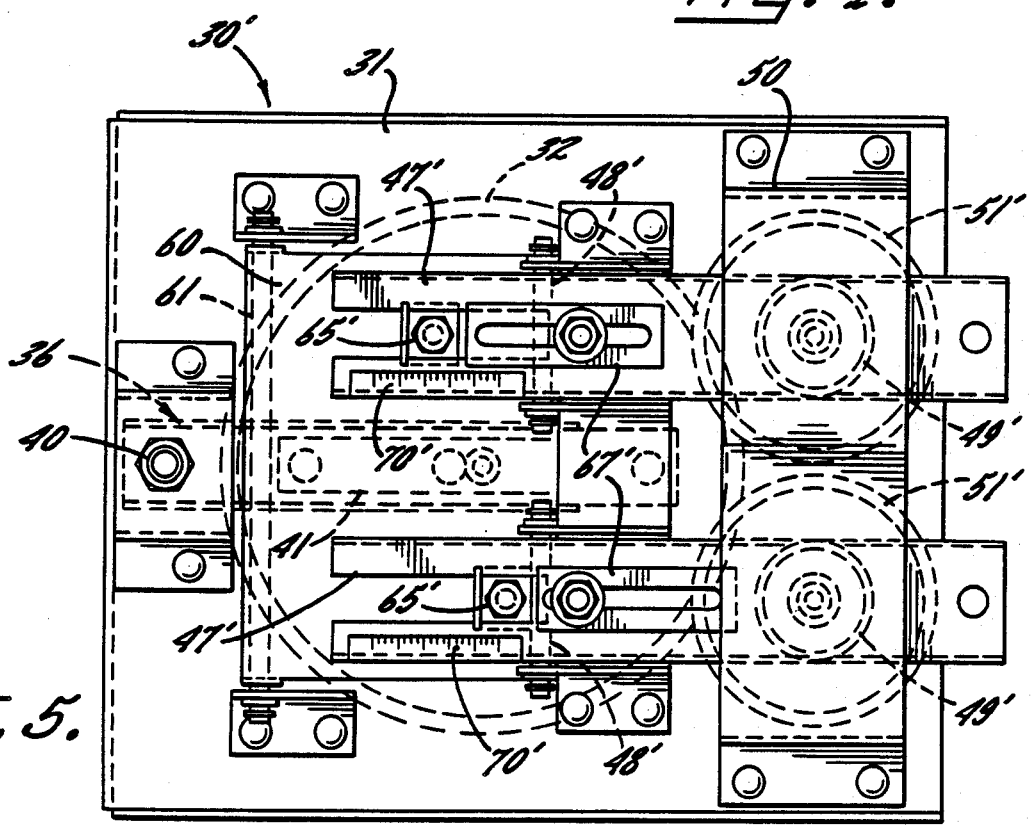
FIG. 5 is a view similar to FIG. 2 but shows another embodiment of a controller incorporating the features of the invention.

Another embodiment of a controller 30' embodying the invention is shown in FIG. 5 in which parts corresponding to parts of the first embodiment are indicated by the same reference numerals and in which parts similar to but somewhat different from the parts of the first embodiment are indicated by primed reference numerals. The controller 30' is of the dual reset type in that it resets the volumetric rate of flow as a function of two sensed conditions rather than as a function of a single sensed condition. The above-identified Maxson et al patent fully describes the function, operation and environment of a dual reset controller. The present dual reset controller 30' may be incorporated in a system of the type shown in FIG. 2 of the Maxson et al patent.

Briefly, the dual reset controller 30' includes two side-by-side levers 47' which are pivoted on pins 48'. An actuator 51' is associated with one end portion of each lever. One actuator pivots its lever in response to one sensed condition while the other actuator independently pivots its lever in response to a different sensed condition or variable signal.

The opposite end portion of each lever 47' carries a slide 67' having a vertically adjustable set screw 65', the slide being adjustable lengthwise of the lever. Each set screw is adapted to engage the underside of the lever 60 to effect pivoting of the latter.

The controller 30' may be set up with the set screw 65' of one of the levers 47' (e.g., the lower lever in FIG. 5) positioned at a higher elevation and positioned further to the right than the other set screw. After the actuator 51' for the lower lever 47' has moved through its full opening range of travel, control of the lever 60 may be taken over by the upper lever 47' and set screw 65' to cause the flapper 36 to open further under the control of the upper actuator 51' and a variable condition sensed thereby. Accordingly, the principles of the invention may be applied to a dual reset controller as well as a single reset controller while utilizing many of the same parts in both types of controllers.

I claim:
1. A pneumatic controller of the reset type for providing a pneumatic control signal, said controller comprising a pneumatic control signal bleed nozzle, a flapper associated with said nozzle, a pressure differential-to-mechanical force transducer for applying a force tending to move said flapper in one direction relative to said nozzle, a bias member having a free end portion for applying a force tending to move said flapper in the opposite direction relative to said nozzle, the position of said flapper relative to said nozzle being determined by a balance of the opposed forces applied to said flapper, said pneumatic control signal varying as a function of the position of said flapper, a first pneumatic reset actuator for producing a first reset force as a function of a variable sensed condition to alter the force applied by said bias member to said flapper, a first pivotally mounted lever acted upon by said first reset force, first bias means for applying force to said first lever in oppo- sition to said first reset force whereby the angular position of said first lever is established by a balance of the latter two forces, a second pneumatic reset actuator for producing a second reset force as a function of a variable signal to re-alter the force applied by said bias member to said flapper, a second pivotally mounted lever acted upon by said second reset force, and second bias means for applying force to said second lever in opposition to said second reset force whereby the angular position of said second lever is established by a balance of the latter two forces, the improvement in said pneumatic controller comprising, a third pivotally mounted lever, means on said first lever and engageable with said third lever to cause said third lever to swing in a direction opposite to the direction of swinging of said first lever, said last-mentioned means being selectively adjustable lengthwise of said first lever and also being adjustable transversely of said first lever and toward and away from said third lever, means on said second lever and engageable with said third lever to cause said third lever to swing in a direction opposite to the direction of swinging of said second lever, said last-mentioned means being selectively adjustable lengthwise of said second lever and also being adjustable transversely of said second lever and toward and away from said third lever, and means located between said third lever and said bias member for causing the force applied to said flapper by said bias member to change in response to a change in the position of said third lever.

* * * * *